United States Patent [19]

Scalambra

[11] Patent Number: 5,050,659
[45] Date of Patent: Sep. 24, 1991

[54] MACHINE FOR THE REMOVAL AND REPLACEMENT OF TIRES FOR THE WHEELS OF AUTOMOBILES

[75] Inventor: Giorgio Scalambra, Carpi, Italy
[73] Assignee: G. S. S.R.L., Correggio, Italy
[21] Appl. No.: 515,967
[22] Filed: Apr. 27, 1990
[51] Int. Cl.$^5$ ............................................. B60C 25/08
[52] U.S. Cl. ...................................... 157/1.24; 157/16
[58] Field of Search ...................... 157/1.17, 1.24, 16, 157/20, 17, 18

[56] References Cited

U.S. PATENT DOCUMENTS

| | | | |
|---|---|---|---|
| 3,905,413 | 9/1975 | Myers | 157/1.24 |
| 4,209,053 | 6/1980 | Du Quesne | 157/1.24 |
| 4,750,538 | 6/1988 | Du Quesne | 157/1.24 |
| 4,884,611 | 12/1989 | Schmidt | 157/1.24 |

Primary Examiner—James G. Smith
Attorney, Agent, or Firm—Browdy and Neimark

[57] ABSTRACT

A machine for the removal and replacement of tires for the wheels of automobiles of the type comprising a self-centering rotating platform (2) which can grip the wheel, above which a vertical toolhead arm (5) is positionable. The rotation of said platform and the activation of an unbeading device (6) located and mounted at the side of the machine are obtained by means of a pneumatic cylinder (10). A second pneumatic cylinder (39) commands the opening and closing movements of the jaws (38) for the gripping of the wheel rim which are arranged on the self-centering platform (2). The compressed air used in the feeding of the pneumatic devices come from a structural element which forms part of the frame of the machine.

7 Claims, 4 Drawing Sheets

MACHINE FOR THE REMOVAL AND REPLACEMENT OF TIRES FOR THE WHEELS OF AUTOMOBILES

SUMMARY OF THE INVENTION

The present invention relates to a machine for the removal and replacement of tires for the wheels of automobiles. Said invention comprises a frame on which a self-centering platform is arranged, rotatable around a usually vertical axis on which the wheel rim can be centered and blocked. By the side of the platform and fixedly mounted to the frame of the machine is a post, at whose top a substantially horizontal arm is attached which at its free end is coupled in an axially slidable way with a vertical toolhead arm. Externally and to the side of the machine an unbeading device is mounted, whose function is to detach the bead of the tire from the wheel before proceeding to the removal operation.

Machines of this type in the present art are normally equipped with motorized means needing electrical power for at least part of the operation.

Principal aim of the present invention is to provide a machine for the removal and replacement of tires which requires for its functioning only the power supplied by compressed air.

Said aim and others are achieved by the present invention, which concerns a machine for the removal and replacement of tires of the wheels of automobiles, comprising:

a frame on which is arranged a self-centering platform rotatable around a vertical or almost vertical axis, on which the wheel rim is blocked and centered;

an arm, substantially horizontal, mounted at right angles to the top of a fixed post mounted on said frame;

a toolhead arm positionable above said platform coupled in an axially slidable way to the free end of said horizontal arm;

means for the blocking of said arms and in particular for the blocking of the toolhead arm in a correct and pre-established position with regard to the rim of the wheel blocked on said platform;

an unbeading device mounted to one of the external sides of the machine.

The machine further comprises:

the first of two pneumatic motors having a rack and pinion mechanism with a clutch interposed, for the transmission of rotation to said platform, and having the simultaneous function of activating said unbeading device;

means to disengage said clutch and simultaneously activate said unbeading device;

the second of two pneumatic motors comprising a pneumatic cylinder located co-axially to said platform and commanding, by the movement of its stem, the movement of the jaws for the gripping of the wheel blocked on said platform;

a tank for the compressed air used in powering the machine comprising a straight tubular section structural element, whose convex external surface also forms part of the upper surface of the body of the machine itself, above which are arranged said platform and said post.

Advantages of the present invention are its compactness and its operative simplicity.

Further characteristics and advantages of the present invention will better emerge during the detailed description which follows of a preferred but not unique embodiment of said invention, which is illustrated in the attached diagrams purely in the form of an example and is therefore not to be considered as unique.

BRIEF DESCRIPTION OF THE DRAWINGS

The invention will now be described by reference to the drawings wherein.

DESCRIPTION OF THE PREFERRED EMBODIMENT OF THE INVENTION

Figure 4:
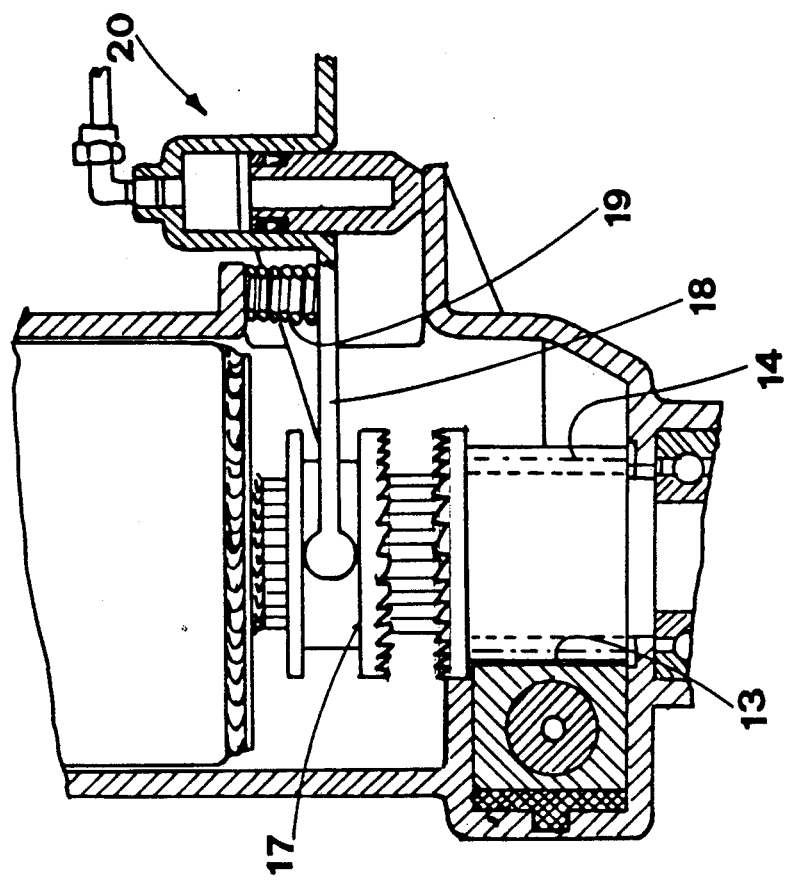
FIG. 4 is, in enlarged scale, part of a section made according to plane III—III.
Figure 1:
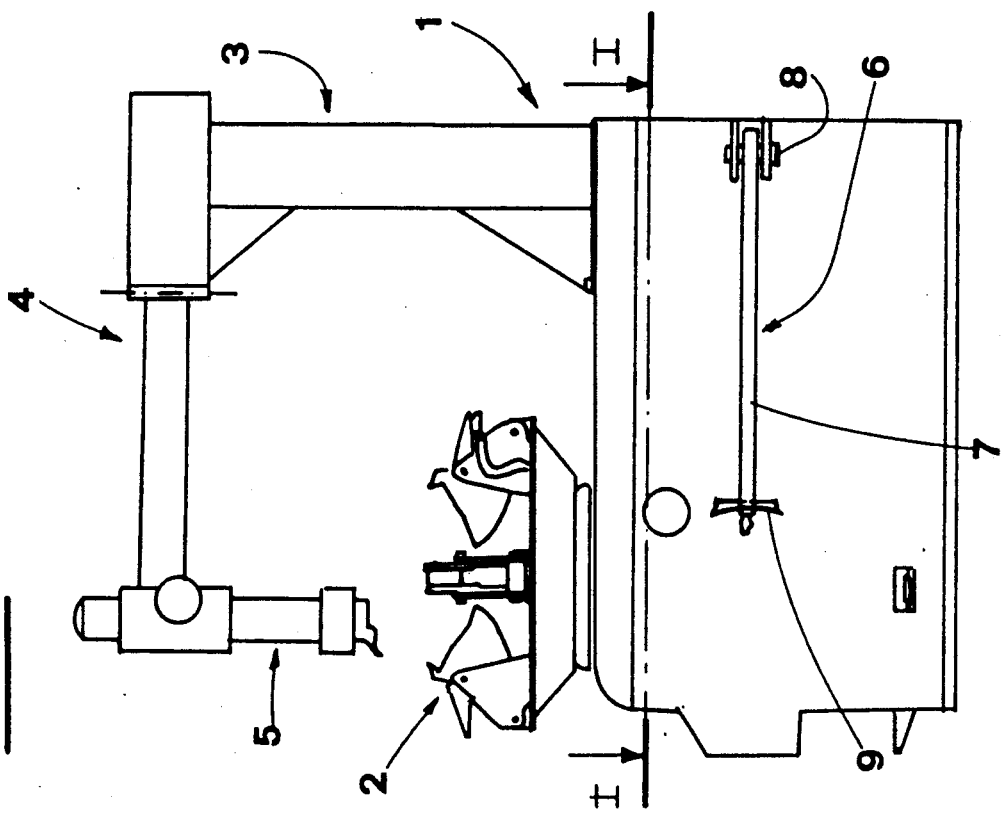
FIG. 1 is a schematic side view in vertical elevation.

With reference to the drawings, in FIG. 1 the box-shaped frame of the machine is represented, on the top of which are arranged the self-centering platform (2), rotatable around a vertical axis, on which the wheel is blocked and centered; and a fixed post (3) to whose top end is mounted at right angles a horizontal arm (4), which on its free end has a toolhead arm (5) attached. Mounted to one side of the frame is an unbeading devise (6) which essentially comprises a moving arm (7) pivoted at the side of the frame (1) by means of a vertical-axis pivot (8) and equipped at its free end with a trowel-shaped unbeading tool (9). The means for the blocking and positioning of the toolhead arm (5) and the horizontal arm (4) are of known type.

The rotation of the self-centering arm (2), like the activating of the unbeading devise (6) are produced pneumatically by the action of one pneumatic cylinder (10) housed inside the frame (1). Said cylinder is equipped with two stems, the front section of one of them having a rack (13) externally positioned on it, which can engage with a pinion (14) coaxially mounted and idle on the shaft (15) of the rotatable platform (2). The pinion (14) exhibits frontally a plurality of triangular teeth (16) corresponding to the teeth of a hub (17) coupled coaxially and axially slidably on same shaft (15). The hub (17) has a throat in which the ends of a fork (18) are inserted, whose parallel movements with respect to the axis of the shaft (15) determine the engagement or non-engagement of the frontal teeth (16) of the pinion (14) with those of the hub (17). A spring (19), acting on the hub (17), tends to hold the hub (17) and the pinion (14) in the engaged position, keeping them together during rotation. A small hydraulic cylinder (20) acts on the fork (18) to produce, antagonistically with regard to the spring (19), the distancing of the hub (17) from the pinion (14) and therefore the disengagement. The small cylinder (20) is constantly fed and begins emptying only when the work stroke of cylinder (20), aimed at producing rotation of the platform (2) is commanded via the activating of the valve (21). The self-centering platform (2) is free to rotate in either direction around its axis as long as the command which produces the engaging of the hub (17) with the pinion (14) is not given. The fact that the platform (2) is "normally" rotatably free is advantageous for the performance of those maneuvers, such as the positioning of the valve, insertion of the inner tube (if necessary) and the tire bead which the operator performs during the mounting of the tire. On the compressed-air conduit which links the valve (21) to the small cylinder (20) a valve (22) is positioned in series, which is mechanically activated by action of the moving arm (7) of the unbeading devise (6). In the conduit which links said valve (21) with the cylinder (10) a fast-emptying valve (42) is positioned, by means of which, during the return stroke of the piston of the cylinder (10), the air is evacuated without passing through valve (21).

Figure 5:
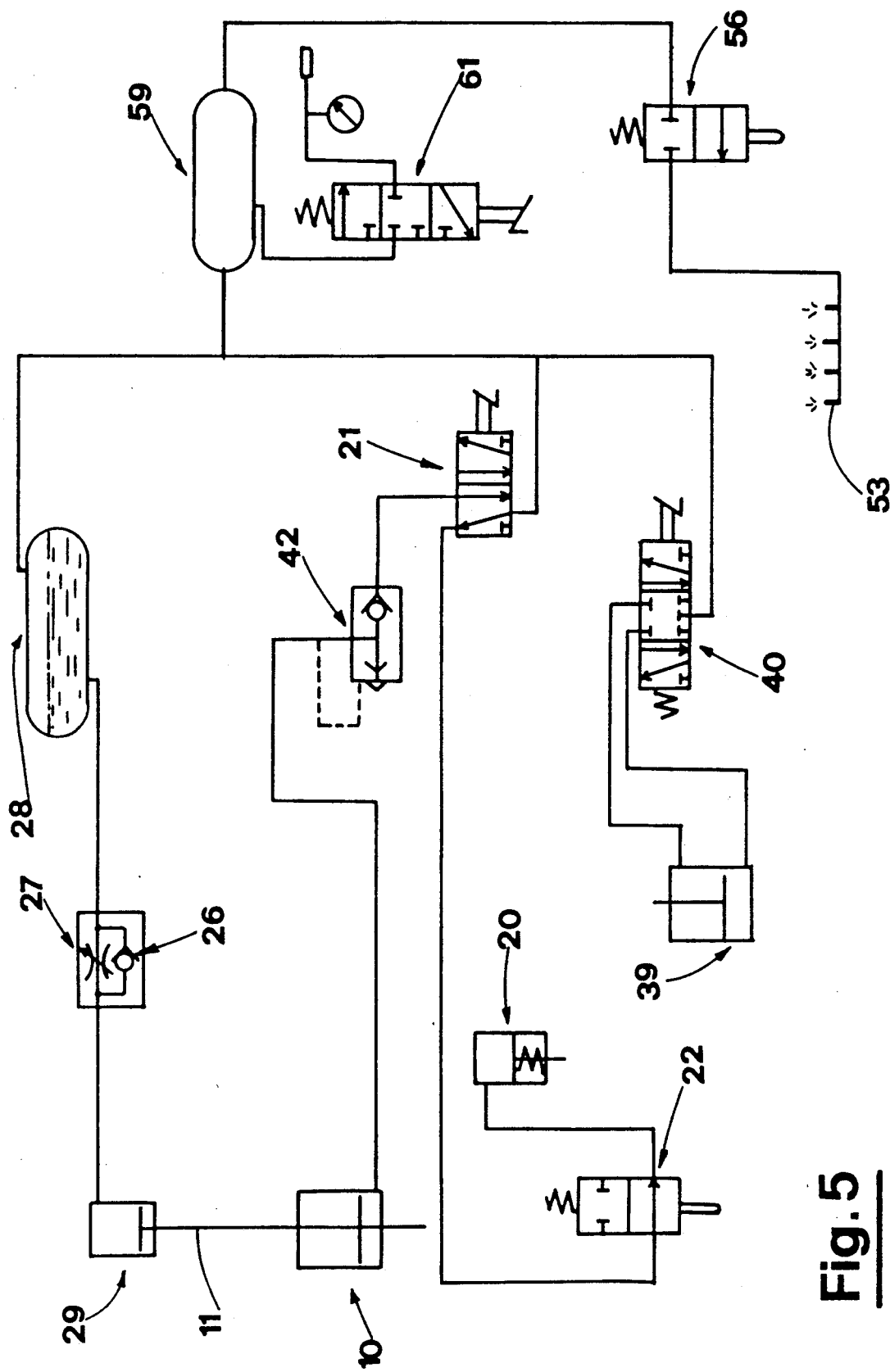
FIG. 5 is the simplified scheme of the pneumatic circuit for the supply of the various actuators with which the machine is equipped.

The speed of the work stroke of the cylinder (10) is regulated by means of a hydraulic system associated with the front section of the stem (11) which exhibits externally the rack (13). Said front section of the stem (11) is internally hollow and therein is coupled with an axially slidable piston element (23), which is fixed to the frame (1). Said piston element (23) defines a closed chamber of variable volume (24) within the front part of the stem (11), which communicates with a reservoir (28) containing liquid under pressure through a conduit whose first part comprises a through-hole (25) bored in the piston element (23). On said communication conduit, correspondingly to the through-hole (25), a calibrated no-return valve (26) aimed at permitting the unidirectional flow of liquid from the reservoir (28) to the closed chamber (24), and an adjustable throttle valve (27) are located in parallel. The reservoir (28) is only partially filled with liquid and is pressurised by means of compressed air coming from a tank (59). During the work-stroke the liquid contained in the closed chamber (24) is forced to flow to the reservoir (28) through the throttle valve (27) which by regulating the flow determines the velocity of the stem of the pneumatic cylinder (10). During the return-stroke the flow inverts and almost all of the liquid flows from the reservoir (28) to the closed chamber (24) by going through the valve (26). In this way the return-stroke of the piston is effected. In FIG. 5 the coupling between the first section of the stem (11) and the piston element (23) is schematically represented by the hydraulic cylinder (29).

Figure 2:
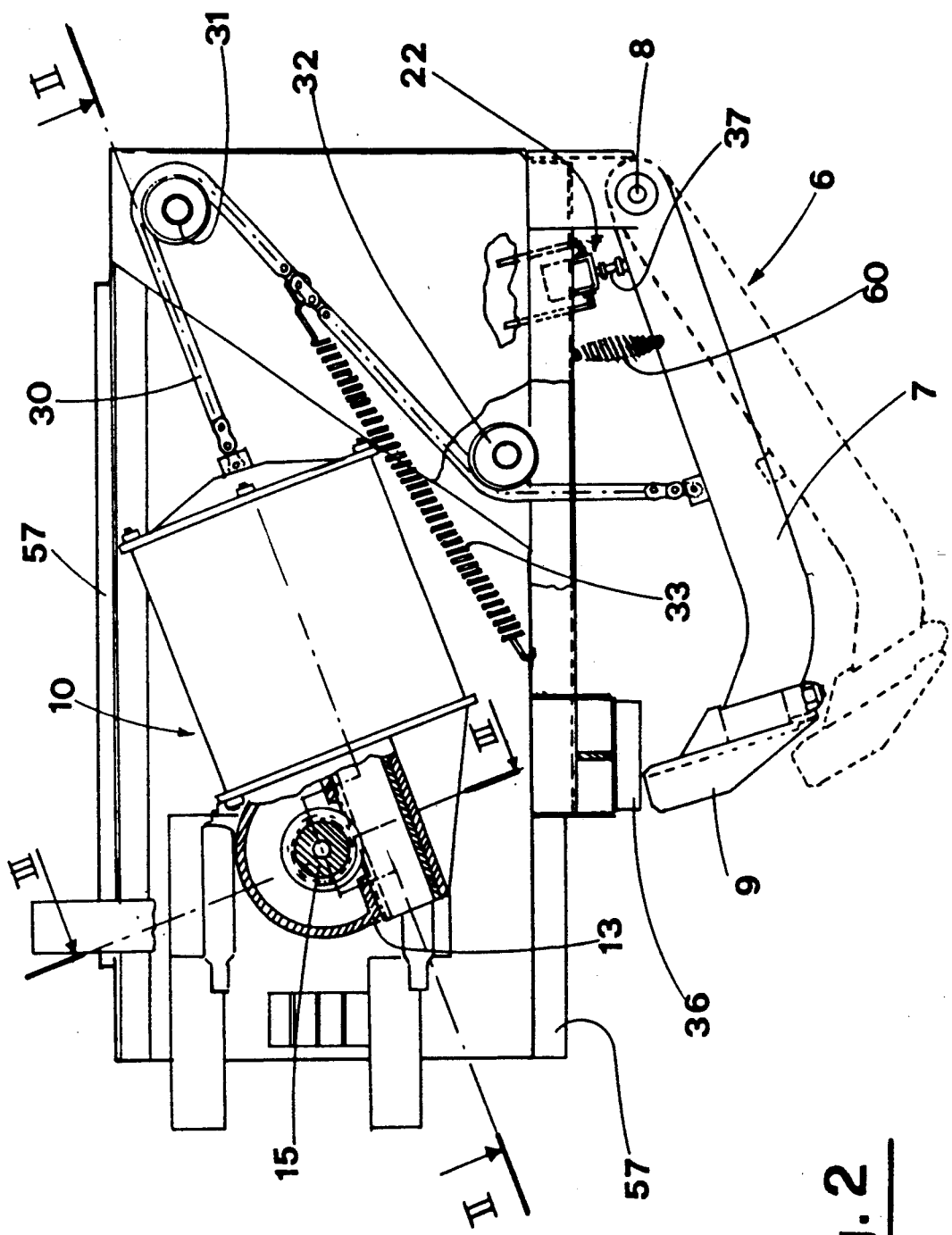
FIG. 2 is, in enlarged scale, a partial section made according to plane I—I of FIG. 1.
Figure 3:
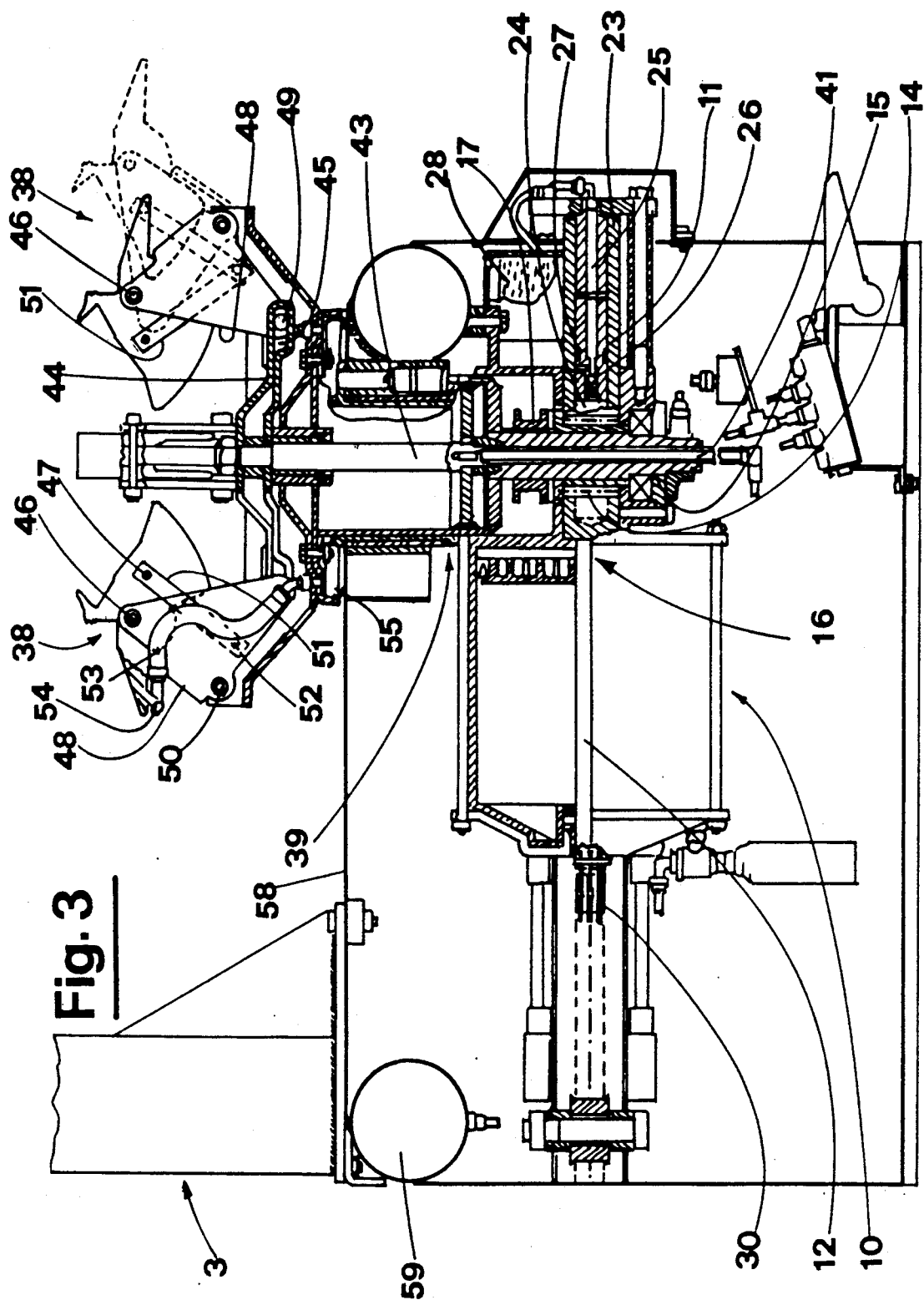
FIG. 3 is a schematic partial section made according to plane II—II of FIG. 2.

The second section of the stem (12) of the piston of the cylinder (10) is attached to the end of a chain (30) which has its other end fixed to a point approximately halfway along the moving arm (7) of the unbeading devise (6). The chain (30) is bent around two idler wheels (31) and (32) and is linked to a spring (33) whose function is to maintain said chain (30) in a state of tension also when the second section of the stem (12) is fully out of the pneumatic cylinder (10) (rest position). In the same way the moving arm (7), which is pivoted by a vertical pivot (8) to the side of the frame (1), is held with its unbeading tool against a fixed striker (36) with the help of another spring (60). In this position the moving arm (7) acts, via element (37), on the valve (22) keeping it in the position illustrated in FIG. 2. Thus when the moving arm (7) is distanced from the striker (36) in order to perform the unbeading operation, the valve (22) is put into the closed position and the small pneumatic cylinder (20) remains under pressure and maintains the hub (17) in a disengaged position with respect to the pinion (14). Then the valve (21) can be activated in order to command the activation of the pneumatic cylinder (10), which in its work-stroke pulls the moving arm, previously distanced by hand, to the striker (36) so that it can perform the unbeading operation. The platform (2) is not made to rotate by this action since the pinion (14) is disengaged from the rotatable hub (17) and idles on the shaft (15). The platform (2) is self-centering and is provided with a plurality of jaws (38) permitting the gripping of the wheel rim. The opening and closing movements of the rim-gripping jaws are effected by action of a second hydraulic cylinder (39) positioned coaxially to the shaft (15) of the platform (2) and commanded by means of a valve (40). The cylinder is fed by means of a coaxial conduit (41) bored in the lower part of the stem (39). At the end of the upper part of the stem of cylinder (39) identical radial arms (44) are fixed, each of which exhibits a slot (45) normal to the axis. The number of arms (44) is exactly equal to the number of jaws (38) present on the platform (2). Each jaw (38) functions mechanically as the member with a connecting rod function in a hinged parallelogram where the opposite member acts as frame.

The hinge pivot axes (46) and (47) of each jaw (38) are parallel. One of the members with crank function of each jaw (38) is formed by two parallel cornered levers (48), symmetrically coupled and provided with a coupling pivot (49) with axis parallel to the hinge axes (46) and (47), which fits into the slot (45) of the arm (44). The two cornered levers (48) are hinged to the body of the platform (2) by means of a pivot (50). The remaining member with crank function in said hinged parallelogram is represented by the rod (51) which is hinged, by one of its ends, to the jaw (38) by means of the hinge pivot (47) and by its other end to the body of the platform (2) by means of the pivot (52). It is simple to understand how the movement in axial direction of the stem (43) of the cylinder (39) produces the opening, if the movement is upwards, and the closing, if the movement is downwards, of the jaws (38), which are shaped so as they can grip the rim both from the outside and the inside. To the body of each jaw (38) is mounted a last section, or exit mouth (54) of a conduit (53) having a flexible intermediate section. The exit mouths (54) are located in proximity to the gripping organs of the jaws (38) with the aim of permitting, on command, the entrance of compressed air between the tire and the rim in order to begin the inflation of tires without inner tubes (this is to force the bead of the tire into position on the wheelhub). The compressed air is sent to the conduits (53) via an annular chamber (55) positioned coaxially external to the cylinder (39). The sending of the air to the conduits (53) is commanded by means of a pedal-action valve (56).

FIG. 5 shows, coming from the tank (59), an air source whose function is the "normal" inflation of the tires. The use of this air source is made possible by the presence of a valve (61). The tank (59), linkable to the distribution network of compressed air, is constituted by a straight tubular-section structural element, part of whose convex exterior surface acts as part of the upper external body of the machine, on which are mounted the post (3) and the self-centering platform (2). To this structural element are mounted the side walls (57) and the upper wall (58), which together constitute the frame (2) of the machine.

Obviously many modifications of a practical nature could be made to the machine as described above, without going out from the scope of the inventive idea as expressed in the appended claims.

What is claimed:

1. Machine for the removal and replacement of tires for wheels of automobiles comprising:
   a frame (1) on which a self-centering platform (2) is arranged rotatable around a vertical or almost vertical axis on which a wheel rim can be centered and blocked;

a substantially horizontal arm (4) which at an end is coupled with a first vertical toolhead arm (3) mounted to said frame (1);

a second vertical toolhead arm (5), positionable above said self-centering platform (2) and coupled at an end in an auxiliary slidable way to said substantially horizontal arm (4);

an unbeading device (6) mounted to one external side of the machine;

further comprising:

first of two pneumatic motors having a first pneumatic cylinder (10) for transmission of rotation to said self-centering platform (2) by means of a rack and pinion mechanism (13 and 14) with a clutch interposed, and having simultaneous function of activating said unbeading device (6); pneumatically commanded means for disengaging said clutch and simultaneously activating said unbeading device (6);

second of two pneumatic motors comprising a pneumatic cylinder (39) located co-axially to said self-centering platform (2) and commanding, by movement of its stem, movement of jaws (38) mounted on said platform (2) for gripping of a wheel blocked on same platform (2);

a tank (59) for compressed air used in powering the machine comprising a straight tubular section structural element, whose convex external surface also forms part of an upper surface of the body of the machine, above which are arranged said platform (2) and said vertical tool head (3).

2. Machine as in claim 1, wherein said first pneumatic motor cylinder (10) has a double stem and exhibits its first section (11) frontally, which is equipped with a rack and its second section (12), posterior, attached to a chain (30) and thus transmitting motion to a moving arm (7), which is equipped with an unbeading tool (9) forming part of said unbeading device devise (6); said rack (13) engages with a pinion (14) mounted coaxially idle on a shaft (15) of said platform (2) and said pinion (14) exhibits frontally a plurality of triangular teeth (16) corresponding to teeth of a hub (17) coupled coaxially on said shaft (15) and being only axially slidable to it; said hub (17) being held in an engaged position by elastic means and being commanded to slide axially in order to be brought in a non-engaged position by the action of a small hydraulic cylinder (20); said small cylinder (20) being constantly fed and inactive only when the workstroke of said first cylinder (10) is commanded in order to produce rotation of said platform (2).

3. Machine as in claim 1 wherein a frontal first section of a stem (11) is internally hollow and therein is coupled with an axially slidable piston element (23), which is fixed to the frame (1) and which defines a closed chamber of variable volume (24) within a front part of the stem (11); said closed chamber (24) communicates with a reservoir (28) containing liquid under pressure via two valves (26 and 27) arranged on said element (23) being located in parallel on a conduit bored in a body of said element (23) and destined to enable communication said closed chamber (24) and said reservoir (28); of said two valves, (26) is a no-return valve permitting unidirectional flow from the reservoir (28) to the closed chamber (24), while valve (28) is a throttle valve.

4. Machine as in claim 2, wherein said chain (30), is attached at one end to a second, posterior section of stem (12) and at the other end to said moving arm (7), is bent around two idler wheels (31) and (32) and is connected to a spring (33) whose function is to maintain said chain (30) in a state of tension also when a second section of the stem (12) is fully out of the first pneumatic motor cylinder (10).

5. Machine as in claim 3, wherein said reservoir (28) containing liquid under pressure is pressurized by means of compressed air.

6. Machine as in claim 1, wherein each of said jaws for the gripping of the wheel rim functions mechanically as a member with a connecting rod function in a hinged parallelogram where an opposite member acts as frame; wherein hinge pivot axes (46) and (47) of each jaw (38) are parallel; and, wherein one of the members with a crank function of each jaw (38) is formed by two parallel cornered levers (48), symmetrically coupled and provided with a coupling pivot (49) with axis parallel to the hinge axes (46) and (47), by means of which they are attached to an end of the stem of said pneumatic cylinder (39).

7. Machine as in claim 6, wherein each coupling pivot (49) fits into a slot (45) normal to the axis of said platform (2) and cut into a radially fixed arm at the end of the stem of said second pneumatic cylinder (39).

* * * * *